(12) United States Patent
Riello et al.

(10) Patent No.: US 6,216,798 B1
(45) Date of Patent: Apr. 17, 2001

(54) WORK UNIT FOR MACHINE TOOL, WITH LINEAR ELECTRIC MOTOR FOR AXIAL MOVEMENT OF THE SPINDLE

(75) Inventors: Andrea Riello; Zeno Borsaro, both of Minerbe (IT)

(73) Assignee: Riello Macchine Transfer Srl, Minerbe (Verona) (IT)

( * ) Notice: Subject to any disclaimer, the term of this patent is extended or adjusted under 35 U.S.C. 154(b) by 0 days.

(21) Appl. No.: 09/216,030

(22) Filed: Dec. 18, 1998

(30) Foreign Application Priority Data

Dec. 19, 1997 (IT) .............................................. MI97A2812

(51) Int. Cl.[7] .............................. B23Q 5/00; B23B 39/10

(52) U.S. Cl. .......................... 173/152; 173/117; 173/141; 173/159; 408/129; 409/231

(58) Field of Search ..................................... 173/152, 157, 173/159, 4, 141, 117; 408/129, 44, 1 R, 124; 409/231, 135, 235; 82/118; 310/12–14

(56) References Cited

U.S. PATENT DOCUMENTS

| | | | | |
|---|---|---|---|---|
| 2,884,819 | * | 5/1959 | Roubloff | 173/152 |
| 3,753,384 | * | 8/1973 | Anfindsen | 408/129 |
| 4,088,417 | * | 5/1978 | Kosmowski | 408/1 R |
| 4,646,595 | * | 3/1987 | Slee | 82/118 |
| 4,869,626 | * | 9/1989 | Kosmowski | 408/129 |
| 4,958,967 | * | 9/1990 | Adachi | 409/231 |
| 5,009,554 | * | 4/1991 | Kameyama et al. | 409/231 |
| 5,688,084 | * | 11/1997 | Fritz et al. | 409/235 |
| 5,920,973 | * | 7/1999 | Kosmowski | 408/44 |
| 5,997,223 | * | 12/1999 | Kosmowski | 409/231 |

* cited by examiner

Primary Examiner—Peter Vo
Assistant Examiner—Jim Calve
(74) Attorney, Agent, or Firm—Helfgott & Karas, P.C.

(57) ABSTRACT

The invention concerns the work units for automatic machine tools in which a spindle (5) moves in translation and rotates with respect to a work axis (Z). More particularly in these units, in order to obtain the rotation/translation of the spindle, the latter is housed in a sleeve (3) that slides along the work axis (Z), with respect to which it is however free to turn.

6 Claims, 3 Drawing Sheets

WORK UNIT FOR MACHINE TOOL, WITH LINEAR ELECTRIC MOTOR FOR AXIAL MOVEMENT OF THE SPINDLE

BACKGROUND OF THE INVENTION

The invention concerns a work unit (or operating unit) for automatic machine tools, also known as transfer machines.

As is already known, these machines make it possible to carry out a series of successive machining operations (drilling, screw-threading, etc.) on the same workpiece, in very short times by virtue of the maximum reduction of the idle times between one machining operation and the other.

This occurs because the workpieces are mounted on a rotating table round which there are located work units, variable in number depending on the number of single operations, and which execute predetermined operating cycles while the workpieces are brought in front of them by the controlled rotations of the table; the latter may have a horizontal or vertical axis, depending on the model of machine.

The present invention relates to a new type of machining unit.

Said units comprise a spindle intended to actuate a tool, which is supported in such a manner as to have in addition to the normal rotational work movement about its axis (commonly indicated as the "Z" axis), also that of advance and return along the said axis.

In order to obtain these effects it is now an established practice to mount the spindle rotatably inside a sleeve where, however, it is locked axially, causing the said sleeve instead to be able to slide along the work axis of the spindle; the desired axial translational movements of the latter are therefore obtained by causing it to move integrally with the sleeve and independently of its speed of rotation.

To this end, for the movement of the spindle/sleeve assembly, various alternative solutions are known which can be grouped principally into electromechanical and hydraulic solutions; the first indeed make use of mechanisms of various types (worm gears with ball recirculation or the like) driven by electric motors, while the second use a pressurized fluid to displace the sleeve like a doubleacting piston.

Both of these categories of axial control of the spindle/sleeve assembly, however, render their development problematical, especially in view of obtaining better performances with regard to the axial velocity and acceleration of the spindle.

It is in fact necessary to take into account that an increase in these parameters has immediate repercussions on the reduction of the idle times during machining and therefore on the productivity of the entire machine, thus making this of particular interest.

However, with the current electromechanical or hydraulic systems a significant increase in the velocity and acceleration of the spindle along its axis entails an increase in the complexity and dimensions of the corresponding work unit, such as to render this eventuality not very convenient.

SUMMARY OF THE INVENTION

It is therefore the aim of this invention to provide a work unit for machine tools in general and in particular for those of the so-called transfer type with rotating table, with such structural and operational features as to overcome this situation. In other words, the invention proposes to provide an improved work unit wherein the means which control the advance and return of the spindle along its work axis Z, make it possible to achieve velocities and accelerations greater than those normally found in the known units, without however increasing its structural complexity and overall dimensions.

This object is achieved by an operating unit characterized in the claims annexed to this description.

The invention will be better understood in the light of two of its preferred and non-exclusive exemplary embodiments which are described hereinafter with reference to the appended drawings wherein:

DETAILED DESCRIPTION OF THE INVENTION

Figure 1:
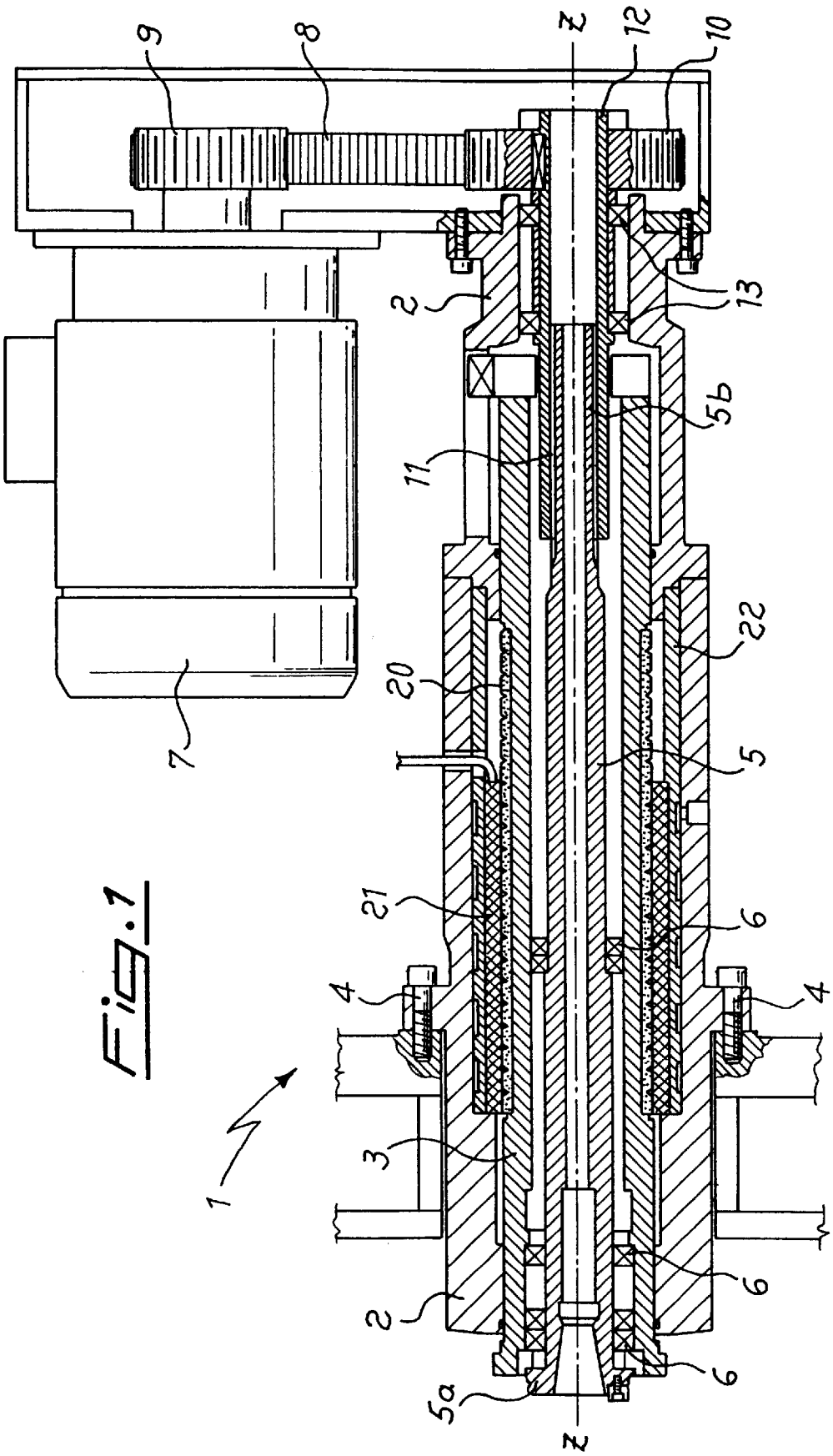
FIG. 1 shows a view in longitudinal section of a first operating unit according to the invention.

In the drawings, the reference 1 indicates the work unit of the present invention, which is formed of an outer tubular body 2, wherein a sleeve 3 is housed, so as to be able to slide with respect to a work axis Z.

The outer body 2 is mounted on the structure of the machine tool (slightly indicated in FIGS. 1 and 3) in a manner which is known per se, in the present instance by screws 4. Inside the sleeve 3 there is the spindle 5 which is supported by rolling bearings 6, positioned along it between a fore end 5a and a back end 5b of the spindle and locked axially both with respect to the latter and to the sleeve 3, in such a manner as to allow it to rotate freely about the axis Z.

The fore end 5a of the spindle is internally flared and is connected in a known manner to a tool (not shown in the drawings) for the rotation of the latter, while the back end 5b of the spindle receives the motion from a motor 7 by way of a transmission with toothed belt 8 and pulleys 9, 10.

More particularly, the back end 5b of the spindle is provided with longitudinal splines and is coupled, so as to be able to slide axially, with a splined shell 12 coaxial with it and on which is keyed the toothed pulley 10. In practice, the splined shell 12, which is free to rotate in the outer body 2 and is supported by a pair of rolling bearings 13, receives the rotational movement from the motor 7 through the transmission with toothed belt and pulleys, and in its turn controls the rotation of the spindle by means of the coupling with its splines 11.

In this context it should be pointed out that while the shell 12 is axially stationary in the outer body 2, it remains, however, constantly engaged with the spindle 3 in spite of the movements of the latter along the axis Z, integrally with the sleeve 2; this is made possible by the splined coupling which allows freedom of movement in an axial direction between the spindle and the shell 12. For the movement of the spindle 5 along the axis Z, in the unit of the present invention a linear electric motor is provided; as is already known, these motors, developed relatively recently, are a derivative of rotary electric motors, both D.C. and 3-phase alternating current motors.

In the continuation of the description, a brief reference will be made to the application of one of these motors to the unit of the invention, simply for the purpose of allowing greater understanding of the latter; however, for further information on linear motors, reference should be made to the technical publications on the subject.

Figure 2:
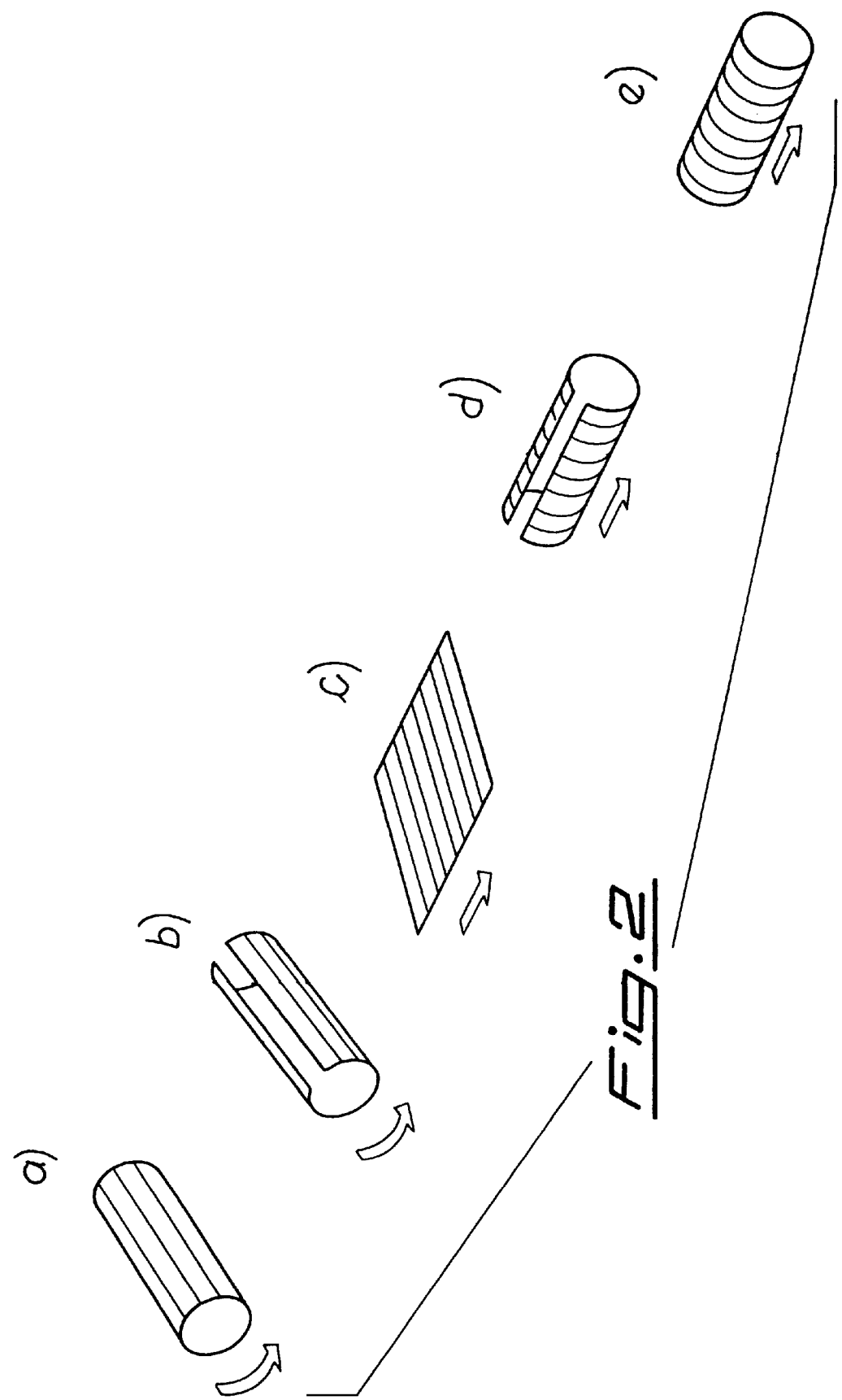
FIG. 2 shows diagrammatically the methods for producing a detail of the unit in FIG. 1.

In this example, the linear motor is of the tubular type, that is to say, obtained by modifying the structure of a rotary motor as shown diagrammatically in FIG. 2 by the successive stages a)–e); these in fact represent the theoretical phases by means of which, from the cylindrical stator (phase a) of an asynchronous rotary motor (the arrow indicates its rotational movement), it is possible to arrive at the tubular stator of a linear motor (the arrow indicates its rectilinear movement).

More particularly, the motor in question comprises a series of permanent magnets 20 fitted externally to the sleeve 3 and therefore integral therewith, a fixed primary winding 21, cooled by a fluid which circulates in a jacket 22, and connected to an electric current supply.

With regard to the functional features of the work unit 1 described above, it can be stated that the latter is capable of performing the same operations as the known work units, with higher performances than the latter.

This is due to the use of the linear motor, which is capable of imparting to the spindle velocities and accelerations which are greater even by an order of magnitude, with respect to those obtainable with the common hydraulic or electromechanical systems; the idle times during machining are consequently reduced, with all the obvious advantages resulting therefrom.

In order to give some idea of the results which can be obtained with the work unit of the present invention, if it is considered that the axial movement systems commonly used at present achieve accelerations of the spindle which vary from 1 to 5 $m/s^2$, with (so-called) high speed of between 8 and 15 m/min., by using instead a linear type electric motor, it is possible to obtain spindle accelerations equal to 10–30$m/s^2$ (that is to say, from 1 to 3 "G") with high speeds equal to 50–100 m/min.

From the above it can therefore be understood how the work unit according to the invention achieves the aim initially set; however, it is also worth to mention some of its advantageous features, which are of considerable importance.

In fact, it makes it possible to eliminate some components present in the known operating units, with a positive simplification of the machine tools.

For example, in the known units of the electromechanical type, the various mechanisms referred to previously and their drive motors, are the cause of inevitable bulkiness and increased structural weight.

This reflects negatively on the precision (higher inertias which render control more difficult) of the machining operations and on the functioning of the machine tool in which the operating unit is mounted: it can in fact be understood that in the case of machine tools with a large number of work centres, the structural complexity becomes such as to render their manufacturing difficult. Similar problems are also encountered in operating units of the hydraulic type, where the equipment for supplying the operating fluid requires control valves, supply pumps and the like; moreover, in order to arrange the actuating cylinder/piston assembly between the sleeve and the outer body of the unit, suitable mechanical machining operations on the coupled surfaces are necessary, which render the production of this type of unit more complicated.

With the present invention, these negative effects are significantly reduced, if not completely eliminated.

It is in fact clear that the use of a linear electric motor acting directly on the spindle sleeve completely eliminates any mechanism for the conversion and/or transmission of the motion between the motor and the sleeve, which may be present in the conventional electromechanical type of units.

Similarly with regard to hydraulic units, the simplification obtained is significant; all the components of the equipment for distribution of the oil are in fact eliminated, and the fitting of the linear electric motor does not require particular mechanical machining operations, unlike what has already been stated in relation to the actuating cylinder.

In general it may be stated that the operating unit of the invention is compact, being entirely enclosed in the outer body 2.

Figure 3:
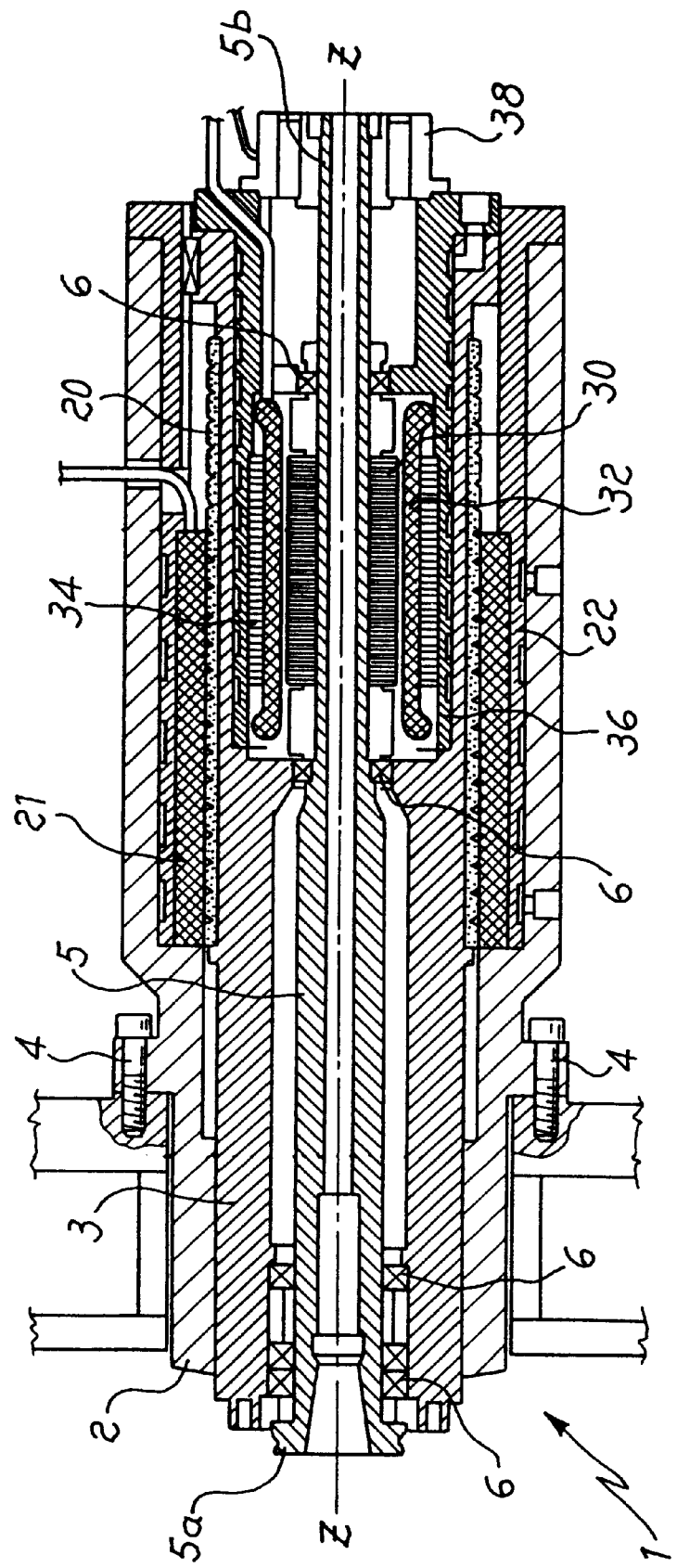
FIG. 3 shows, in a view analogous to that of FIG. 1, a second embodiment of the invention.

Embodiments of the invention other than that described up to now should not of course be excluded; one of these can be seen in FIG. 3 of the drawings where, for the sake of convenience, the elements that are structurally or functionally equivalent to those already considered, have been indicated by the same reference numbers. As can be observed by comparing FIGS. 1 and 3, the second embodiment of the invention differs from the first one in that the spindle 5 is set in rotation by a different system; more precisely, an electric motor of the rotary asynchronous type is used for this purpose.

Said motor comprises a rotor 30 with the corresponding winding of electrical conductors, which is mounted on the spindle 5; around the latter there is a stator 32, the conductors thereof are housed in a casing 34 which according to a preferred form of the invention, is also cooled by a fluid circulating in a suitable jacket 36. The stator 32 and the casing 34 are integral with the sleeve and therefore the entire rotary asynchronous motor just described moves in translation together with the spindle/sleeve assembly when the latter is caused to move along the axis Z, by the linear motor already mentioned.

For the control of the rotation of the spindle, in this second embodiment of the invention there is advantageously placed on its rearward end, which is free since it is no longer coupled to the splined shell, a device 38 for detecting the rotations of the spindle, such as a resolver or similar.

From what has been described above it is therefore easy to understand how this second embodiment of the invention offers, apart from the advantageous effects connected with the use of the linear motor explained previously, a significant simplification of the operating unit also with regard to the rotational drive of the spindle.

It is in fact clear that the fitting of the rotary motor, or at least a part thereof, such as the rotor winding in this case, directly on the spindle eliminates any mechanical transmission between the latter and the motor itself; in the present instance, with respect to the first example of FIG. 1 it can be observed that the toothed belt 8 and pulleys 9, 10, and also the splined shell 12 are eliminated. Furthermore, the machining of the spindle is also simplified in that it is no longer necessary to produce the splines 11 on it. In general this means a significant reduction in the masses in motion and in the inertias which affect the rotation of the spindle, while at the same time a further reduction in the overall size of the operating unit is obtained.

With reference to this last point, it should also be taken into account that the elimination of the shell and of the splined part of the spindle avoids providing a space along the axis Z which permits the telescopic sliding movements between them, caused by the axial movements of the spindle/sleeve assembly; consequently, from this viewpoint also, the second embodiment of the invention contributes to a favourable reduction in the overall size provided by the various moving parts of the work unit. Variants of the invention other than the exemplary embodiments considered here should not of course be excluded.

By way of indication, it may in fact be borne in mind that the linear motor with tubular configuration used in both the examples may be substituted by one of different shape. In other words, although the cylindrical geometry of the motor appears to be the most suitable, for obvious reasons, in this application, the possibility should not be rejected, a priori, of also using one of the other existing configurations of linear motors, for example the single sided or double sided forms.

Moreover, within the framework of these different models of motors there may be different types of supply, that is to say, with alternating current or direct current; in the case of the first hypothesis it is also possible to make a further distinction between induction or asynchronous motors and synchronous motors, with or without brushes. Similar considerations apply also in relation to the rotary electric motor used in the second example of the invention referred to above, in order to set the spindle in rotation; said motor may indeed differ from the asynchronous type considered, in so far as the possibility should not be excluded of substituting it with alternating current motors of other types (synchronous, with or without brushes) or with motors supplied with direct current, although, obviously, in such a manner as to achieve the effects illustrated above. Finally, also with regard to the cooling system, alternatives may be provided with respect to what has been described here; on the other hand it should be pointed out that although the said cooling system is appropriate for eliminating the heat produced by the electric motors present in the operating units, it is not however indispensable for their operation.

These and other possible modifications of the invention, however, come within the scope of the claims which follow.

What is claimed is:

1. Work unit for machine tool, comprising a stationary outer body having an inner surface, a sleeve housed inside said body and adapted for sliding axially with respect to said body along a work axis of the unit, a spindle supported rotatably about the work axis with rolling bearings inside the sleeve and axially stationary with respect thereto, driving means for rotating the spindle, and a linear electric motor for moving axially the sleeve arranged between the sleeve and the outer body, wherein the linear electric motor is tubular and arranged coaxially with respect to the work axis of the unit, and wherein the linear electric motor comprises a primary winding arranged on the stationary outer body, and permanent magnets arranged on the sleeve, and wherein the driving means for the rotation of the spindle is housed inside the sleeve and comprises an electric rotary motor having a rotor arranged on the spindle and a stator arranged on the sleeve.

2. Work unit according to claim 1, wherein the electric rotary motor is an asynchronous motor.

3. Work unit according to claim 2, comprising a first cooling system for cooling the electric linear motor which moves axially the sleeve, comprising a first jacket provided inside the stationary outer body between the outer body and said primary winding, in which cooling fluid circulates licking the inner surface of said outer body.

4. Work unit according to claim 3, comprising a second cooling system for cooling the rotary electric motor of the spindle, comprising a second jacket provided inside the sleeve between the sleeve and said stator of the motor, said sleeve having an inner surface, in which cooling fluid circulates licking the inner surface of the sleeve.

5. Work unit according to claim 4, wherein said spindle has a back end, said work unit further comprising a device for detecting the rotations of the spindle associated to the back end thereof.

6. Work unit according to claim 5, wherein the device is an encoder or a resolver.

* * * * *